(12) United States Patent
Zheng et al.

(10) Patent No.: US 9,063,226 B2
(45) Date of Patent: Jun. 23, 2015

(54) DETECTING SPATIAL OUTLIERS IN A LOCATION ENTITY DATASET

(75) Inventors: Yu Zheng, Beijing (CN); Jianqiao Feng, Beijing (CN); Xing Xie, Beijing (CN); Wei-Ying Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 580 days.

(21) Appl. No.: 12/353,940

(22) Filed: Jan. 14, 2009

(65) Prior Publication Data

US 2010/0179759 A1 Jul. 15, 2010

(51) Int. Cl.
*G01S 19/40* (2010.01)

(52) U.S. Cl.
CPC ...................................... *G01S 19/40* (2013.01)

(58) Field of Classification Search
CPC ........... G06G 7/78; G06T 17/05; G01S 19/40
USPC ............................. 700/300; 382/113; 701/300
See application file for complete search history.

(56) References Cited

U.S. PATENT DOCUMENTS

| | | | |
|---|---|---|---|
| 5,428,546 A * | 6/1995 | Shah et al. ..................... 701/454 |
| 5,802,492 A | 9/1998 | DeLorme et al. | |
| 5,845,227 A | 12/1998 | Peterson | |
| 5,904,727 A | 5/1999 | Prabhakaran | |
| 6,023,241 A | 2/2000 | Clapper | |
| 6,091,359 A | 7/2000 | Geier | |
| 6,091,956 A | 7/2000 | Hollenberg | |
| 6,122,628 A | 9/2000 | Castelli et al. | |
| 6,128,279 A | 10/2000 | O'Neil et al. | |
| 6,219,662 B1 | 4/2001 | Fuh et al. | |
| 6,243,647 B1 | 6/2001 | Berstis et al. | |
| 6,317,684 B1 | 11/2001 | Roeseler et al. | |
| 6,317,686 B1 | 11/2001 | Ran | |
| 6,351,775 B1 | 2/2002 | Yu | |
| 6,356,838 B1 | 3/2002 | Paul | |
| 6,385,539 B1 | 5/2002 | Wilson et al. | |
| 6,411,897 B1 | 6/2002 | Gaspard, II | |
| 6,424,370 B1 | 7/2002 | Courtney | |
| 6,427,122 B1 | 7/2002 | Lin | |
| 6,430,547 B1 | 8/2002 | Busche et al. | |
| 6,446,121 B1 | 9/2002 | Shah et al. | |

(Continued)

FOREIGN PATENT DOCUMENTS

| | | |
|---|---|---|
| EP | 1087605 A2 | 3/2001 |
| GB | 2421653 | 6/2006 |

(Continued)

OTHER PUBLICATIONS

Zhang et al. "A Taxonomy Framework for Unsupervised Outlier Detection Techniques for Multi-Type Data Sets", 2007.*

(Continued)

*Primary Examiner* — Naeem Haq
(74) *Attorney, Agent, or Firm* — Stephen A. Wight; Judy Yee; Micky Minhas

(57) ABSTRACT

Disclosed herein are one or more embodiments that arrange a plurality of location entities into a hierarchy of location descriptors. One or more of the disclosed embodiments may determine whether one of the location entities is a spatial outlier based at least in part on presence of one or more other location entities within a predetermined distance of the one location entity. Also, the other location entities and the one location entity may share a location descriptor.

20 Claims, 7 Drawing Sheets

(56) References Cited

U.S. PATENT DOCUMENTS

| | | | |
|---|---|---|---|
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| RE38,724 E | 4/2005 | Peterson |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 * | 2/2010 | Chen et al. .................... 382/113 |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 * | 11/2010 | Strope et al. .................. 704/257 |
| 7,860,891 B2 | 12/2010 | Adler et al. |
| 7,904,530 B2 | 3/2011 | Partridge et al. |
| 7,920,965 B1 | 4/2011 | Nesbitt et al. |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 * | 7/2012 | Youssef et al. ............. 455/456.1 |
| 8,275,649 B2 | 9/2012 | Zheng et al. |
| 8,458,298 B2 | 6/2013 | Josefsberg et al. |
| 8,562,439 B2 | 10/2013 | Shuman et al. |
| 8,577,380 B2 | 11/2013 | Frias Martinez et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0266830 A1 | 11/2006 | Horozov et al. |
| 2007/0005419 A1 | 1/2007 | Horvitz et al. |

(56) References Cited

U.S. PATENT DOCUMENTS

| | | |
|---|---|---|
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1* | 11/2011 | Chen et al. .................... 382/113 |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 | 4/2015 | Zheng et al. |

FOREIGN PATENT DOCUMENTS

| | | |
|---|---|---|
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |
| WO | WO2010062726 A2 | 6/2010 |

OTHER PUBLICATIONS

Zheng et al. "An Algorithm for Spatial Outlier Detection Based on Delaunay Triangulation", International Conference on Computational Intelligence and Security, 2008.*

Shekhar et al. "Data Mining for Selective Visualization of Large Spatial Datasets", Proceedings of the 14$^{th}$ IEEE International Cenference on Tools with Artificial Intelligence, 1082-3409/02 © 2002 IEEE.*

Shekhar et al. "A Unified Approach to Detecting Spatial Outliers", GeoInformatica 7:2, 139-166, 2003.*

Pei Sun, "Outlier Detection in High Dimensional Spatial and Sequential Data Sets", Sep. 2006, School of Information Technologies, The University of Sydney.*

"GPS Track Route Exchange Forum", GPSXchange.com, retrieved on Apr. 16, 2010 at <<http://www.gpsxchange.com/phpBB2/index.php>>, 3 pgs.

"GPS—Waypoints", retrieved on Apr. 15, 2010 at <<http://www.gps-waypoints.net/>>, 1 page.

Graham, "GPS Gadgets Can Reveal More Than Your Location", retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870I6708I0I10140I2I2I0I0I0I0I0I1266I438I0.1.1I2I0&bav=on.2,or.r_gc.r_pw.,cf.osb&fp=533a712cc6ce8baa&biw=1280&bih=808>>, Jun. 2008, pp. 1-2.

Greenfeld, "Matching GPS Observations to Locations on a Digital Map", In the Proceedings of the 81st Annual Meeting of the Transportation Research Board, Washington DC, Jan. 2002, 13 pgs.

Guehnemann, et al., "Monitoring Traffic and Emissions by Floating Car Data," Institute of Transport Studies Australia, Mar. 2004, retrieved from <<http://elib.dlr.de/6675/1/its_wp_04-07.pdf>>, 13 pages.

Gustaysen, "Condor—an application framework for mobility-based context-aware applications", retrieved on Aug. 4, 2009 at <<http://www.comp.lancs.ac.uk/~dixa/conf/ubicomp2002-models/pdf/Gustaysen-goteborg%20sept-02.pdf>>, UBICOMP 2002, Sep. 2002, pp. 1-6.

Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseer.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfIGS6uRPJH0__AaCpICHDQ&usg=AFQjCNFtQttNVHCKYJQZcH052-KmCxIZ0g>>, ACM, Proceedings of Conference on Management of Data, Jun. 1984, pp. 47-57.

(56) References Cited

OTHER PUBLICATIONS

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, Jan. 2007, pp. 55-86.
Hariharan, et al., "Project Lachesis: Parsing and Modeling Location Histories", ACM, In the Proceedings of GIScience, Oct. 2004, pp. 106-124.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication Jul. 1968), pp. 100-107.
Hirose, et al., "Network Anomaly Detection based on Eigen Equation Compression," In Proceedings of the 15th ACM SIGKDD International Conference on Knowledge Discovery and Data Mining, Jun. 28-Jul. 1 2009, 9 pages.
Hjaltason, et al, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, 42 pages.
Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, 7 pages.
Huang, et al, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, 30 pages.
Jan, et al, "Using GPS Data to Understand Variations in Path Choice", retrieved on Apr. 15, 2010 at <<https://pantherfile.uwm.edu/horowitz/www/pathchoice.pdf>>, National Research Council, Transportation Research Board, vol. 1725, 2000, 12 pages.
Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, Nov. 1996, pp. 261-268.
Kanoulas, et al, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, The 22nd International Conference on Data Engineering (ICDE), Apr. 2006, 10 pages.
Kavouras, et al., "A Method for the Formalization and Integration of Geographic Categorizations", Draft version from the International Journal of Geographic Information Science, vol. 16, No. 5, Jul. 2002, 25 pages.
Ke, et al., "Correlated Pattern Mining in Quantitative Databases", ACM Transactions on Database Systems, vol. V, No. N, Apr. 2008, 44 pages.
Ke, et al., "Efficient Correlations Search from Graph Databases", IEEE Transactions on Knowledge and Data Engineering, vol. 20, Issue 12, Dec. 2008, 14 pages.
Kharrat, et al, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), Jun. 2008, pp. 1-17.
Kindberg, et al., "Urban Computing," Pervasive computing, IEEE Computer Society, Jul.-Sep. 2007, pp. 18-20.
Korn, et al, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan./Feb. 2001, pp. 96-111.
Kostakos, et al., "Cityware: Urban computing to bridge online and real-world social networks," Handbook of Research on Urban Informatics, retrieved from <<http://hci.uma.pt/courses/ubicomp/papers/social/kostakos-08.pdf>>, 2008, 9 pages.
Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, Aug. 2004, 10 pages.
Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, Sep. 2006, 18 pages.
Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-108.
Lakhina, et al., "Diagnosing Network-Wide Traffic Anomalies," In Proceedings of the SIGCOMM '04 Conference, Aug. 30-Sep. 3, 2004, 12 pages.
Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jlee.pdf>>, VLDB '08, ACM, vol. 1, Issue 1, Aug. 2008, 14 pages.
Lee, et al., "Trajectory Clustering: A Partition-and-Group Framework," In Proceedings of the 26th ACM SIGMOD '07 International Conference on Management of Data, Jun. 2007, 12 pages.
Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD '07, Jun. 2007, 12 pages.
Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, Apr. 2008, 10 pages.
Lemire, et al, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), Apr. 2005, pp. 1-5.
Li, et al., "A Connectivity-Based Map Matching Algorithm", AARS, Asian Journal of Geoinformatics, 2005, vol. 5, No. 3, pp. 69-76.
Li et al., "Mining User Similarity Based on Location History", ACM Conference on Advances in Geographic Information Systems (ACM GIS 2008), Irvine, California, Nov. 5-7, 2008, Article 34, 10 pages.
Li, et al., "Temporal Outlier Detection in Vehicle Traffic Data," Proceedings of the 2009 IEEE International Conference on Data Engineering, Mar. 29-Apr. 2, 2009, 4 pages.
Li, et al., "Traffic Density-Based Discovery of Hot Routes in Road Networks", Springer-Verlag, SSTD'07 Proceedings of the 10th International Conference on Advances in Spatial and Temporal Databases, Jul. 2007, pp. 441-459.
Liao, et al., "Anomaly Detection in GPS Data Based on Visual Analytics," Proceedings of the 2010 IEEE Symposium on Visual Analytics Science and Technology, Oct. 2010, pp. 51-58.
Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, Jul. 30-Aug. 5, 2005, pp. 249-265.
Liao, et al., "Learning and Inferring Transportation Routines", Elsevier, Artificial Intelligence, vol. 171, Issues 5-6, Apr. 2007, pp. 1-32.
Liao et al., "Learning and Inferring Transportation Routines", American Association for Artificial Intelligence Press (AAAI) 19th National Conference on Artificial Intelligence, San Jose, California, Jul. 25-29, 2004, 6 pages.
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages.
Lippi, et al., "Collective Traffic Forecasting," Proceedings of the European Conference on Machine Learning and Principles and Practice of Knowledge Discovery Database, ECML PKDD 2010, Sep. 2010, pp. 259-273.
Liu, et al., "Uncovering cabdrivers' behavior patterns from their digital traces," Computers, Environment and Urban Systems, Aug. 2010, pp. 541-548.

(56) References Cited

OTHER PUBLICATIONS

Lozano, et al., "Spatial-temporal Causal Modeling for Climate Change Attribution," KDD 2009, Paris, France, ACM, Jun. 28-Jul. 1, 2009, 10 pages.

Mamoulis, et al, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 2004, pp. 236-245.

Manning et al., "An Introduction to Information Retrieval", Draft, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009, pp. 1-5.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, Sep. 16-Oct. 19, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709& CFTOKEN=90308932>>, ACM, KDD 2009, Jun. 28-Jul. 1, 2009, pp. 637-645.

Morimoto, "Mining Frequent Neighboring Class Sets in Spatial Databases", ACM Proceedings of Conference on Knowledge Discovery and Data Mining (KDD), Aug. 2001, pp. 353-358.

Morse, et al, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, SIGMOD '07, Jun. 2007, pp. 569-580.

Nicholson, "Finding the Shortest Route Between Two Points in a Network", British Computer Society, The Computer Journal, 1966, vol. 9, No. 3, pp. 275-280.

Nzouonta, et al, "VANET Routing on City Roads using Real-Time Vehicular Traffic Information," IEEE Transactions on Vehicular Technology, vol. 58, No. 7, Sep. 2009, pp. 3609-3626.

Office Action for U.S. Appl. No. 12/037,347, mailed on Aug. 17, 2011, Yu Zheng, "System for Logging Life Experiences Using Geographic Cues", 9 pgs.

Office Action for U.S. Appl. No. 12/562,588, mailed on Dec. 8, 2011, Yu Zheng, "Mining Life Pattern Based on Location History", 31 pgs.

Park et al., "Location-Based Recommendation System Using Bayesian User's Preference Model in Mobile Devices", J. Indulska et al. (Eds.): UIC 2007, LNCS 4611, Jul. 2007, pp. 1130-1139.

Patterson, et al., "Inferring High-Level Behavior from Low-Level Sensors", Springer-Verlag Berlin Heidelberg, Lecture Notes in Computer Science, International Conference on Ubiquitous Computing, vol. 2864, Oct. 2003, pp. 73-89.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, Oct. 2003, 18 pages.

Pelekis, et al., "Unsupervised Trajectory Sampling," Proceedings of the European Conference on Machine Learning and Principles and Practice of Knowledge Discovery in Databases ECML PKDD 2010, Sep. 2010, pp. 17-33.

Pfoser et al., "Novel Approaches to the Indexing of Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Popivanov, et al., "Similarity Search Over Time-Series Data Using Wavelets", Proceedings of the 18th International Conference on Data Engineering (ICDE'02), IEEE Computer Society, San Jose, CA, Feb. 26-Mar. 1, 2002, 10 pages.

Quddus, et al. "Current Map-Matching Algorithms for Transport Applications: State-of-the-Art and Future Research Directions", Elsevier Ltd., Transportation Research Part C: Emerging Technologies, Oct. 2007, vol. 15, Issue 5, pp. 312-328.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, Sep. 2007, 21 pages.

Ringberg, et al., "Sensitivity of PCA for Traffic Anomaly Detection," SIGMETRICS 2007, Jun. 2007, pp. 109-120.

Rosenfeld, "Connectivity in Digital Pictures," Journal of the ACM (JACM), vol. 17, No. 1, Jan. 1970, pp. 146-160.

Roussopoulos, et al, "Nearest Neighbor Queries", retrieved on Apr. 15, 2010 at <<http://www.cs.umd.edu/~nick/papers/nncolor.pdf>>, ACM, Presentation: Conference on Management of Data, May 1995, pp. 1-23.

Salton, et al., "A Vector Space Model for Automatic Indexing", Communications of the ACM, vol. 18, No. 11, Nov. 1975, pp. 613-620.

Salton, "Dynamic Document Processing", Communications of the ACM, vol. 15, Issue 7, Jul. 1972, pp. 658-668.

Schofield, "It's GeoLife, Jim, But Not as we Know it", The Guardian News, retrieved on Nov. 28, 2011 at <<http://www.guardian.co.uk/technology/2008/mar/13/microsoft.research/print>>, Mar. 12, 2008, 2 pgs.

Sellen, et al., "Do Life-Logging Technologies Support Memory for the Past? An Experimental Study Using SenseCam", available at least as early as Nov 16, 2007, at <<http://research.microsoft.com/sds/papers/SensecamMemCHICamRdy.pdf>>, Conference on Human Factors in Computing Systems, CHI '07, Irvine, CA, Apr. 28-May 3, 2007, pp. 1-10.

"ShareMyRoutes.com: GPS route sharing", retrieved on Apr. 15, 2010 at <<http://www.sharemyroutes.com/>>, 2010, pp. 1-2.

Shekhar, et al., "Unified approach to detecting spatial outliers," University of Helsinki, 2007, 27 pages, <<http://www.cs.helsinki.fi/u/leino/opetus/spatial-k07/maksimainen.pdf>>.

Sherkat, et al, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 2008, pp. 896-908.

Shklovski, et al., "Urban Computing: Navigating Space and Context," IEEE Computer Society, retrieved at <<http://www.itu.dk/people/irsh/pubs/UrbanComputingIntro.pdf>>, Sep. 2006, pp. 28-29.

Simon, et al, "A Mobile Application Framework for the Geospatial Web", retrieved on Apr. 16, 2010 at <<http://www2007.org/papers/paper287.pdf>>, ACM, Proceedings of World Wide Web Conference (WWW), May 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Jun. 2008, 23 pages, retrieved on Apr. 30, 2010 at <<http://www.cs.cmu.edu/-ggordon/CMU-ML-08-109.pdf>>.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, Sep. 2006, pp. 212-224.

(56) References Cited

OTHER PUBLICATIONS

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.

Sun, et al., "On Local Spatial Outliers," Technical Report No. 549, retrieved at <<http://sydney.edu.au/engineering/it/research/tr/tr549.pdf>>, Jun. 2004, 9 pages.

Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100.

Taylor, et al., "Virtual Differential GPS & Road Reduction Filtering by Map Matching", In the Proceedings of ION GPS '99, Twelfth International Technical Meeting of the Satellite Division of the Institute of Navigation, Sep. 1999, pp. 1675-1684.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

Vlachos, et al, "Discovering Similar Multidimensional Trajectories", IEEE Computer Society, Proceedings of Conference on Data Engineering (ICDE), Feb. 26-Mar. 1, 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, Aug. 2003, pp. 236-245.

Wang et al., "Unifying User-based and Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508.

Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth.edu/-tanzeem/pubs/AAA1051WyattD.pdf>>.

Winograd, "Dynamic Cartograms for Navigating Geo-referenced Photographs", available at least as early as Nov 16, 2007, at <<http://cs.stanford.edu/research/project.php?id=289>>, Nov. 12, 2004, 2 pages.

Wu, et al., "Spatio-Temporal Outlier Detection in Precipitation Data," Knowledge Discovery from Sensor Data, Jul. 2010, pp. 1-20.

Xiao, et al, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 2008, pp. 1-10.

Xie et al, "GeoLife: Building social networks using human location history", retrieved on Apr. 15, 2010 at <<http://research.microsoft.com/en-us/projects/geolife/>>, Microsoft Corporation, 2010, 8 pages.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "CloSpan: Mining Closed Sequential Patterns in Large Datasets", retrieved on Aug. 4, 2009 at <<http://citeseerx.ist.psu.edu/viewdoc/download;jsessionid=AFADA02A222CC497F3OCEC7317F6C7A5?doi=10.1.1.12.3538&rep=rep1&type=pdf>>, Proceedings of SIAM Int. Conference on Data Mining, SDM 2003, May 2003, pp. 166-177.

Yan, et al., "Discovery of Frequent Substructures," Mining Graph Data, D. Cook and L. Holder, John Wiley & Sons Inc, Chapter 5, 2007, pp. 99-115.

Yan, et al., "Feature-based Similarity Search in Graph Structures", ACM Transactions on Database Systems, vol. V, No. N, Jun. 2006, pp. 1-36.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.

Ahern, et al., "World Explorer: Visualizing Aggregate Data From Unstructured Text in Geo-Referenced Collections", In the Proceedings of the 7th ACM/IEEE-CS Joint Conference on Digital Libraries, Jun. 2007, pp. 1-10.

Aizawa, et al., "Capture and Efficient Retrieval of Life Log", available at least as early as Nov 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, 50 pages.

Amato, et al., "Region Based Image Similarity Search Inspired by Text Search", Third Italian Research Conference on Digital Library Systems, Padova, Italy, Jan. 29-30, 2007, pp. 78-85.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", website, 2010, 1 page, retrieved on Apr. 16, 2010 at <<http://www.bikely.com/>>.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Borzsonyi, et al., "The Skyline Operator," In Proceedings 17th International Conference on Data Engineering, Apr. 2001, pp. 421-430.

(56) References Cited

OTHER PUBLICATIONS

Brakatsoulas, et al., "On Map-Matching Vehicle Tracking Data", VLDB Endowment, In the Proceedings of the 31st International Conference on Very Large Data Bases, Sep. 2005, pp. 853-864.
Brauckhoff, et al., "Applying PCA for Traffic Anomaly Detection: Problems and Solutions," IEEE INFOCOM, Apr. 2009, 5 pages.
Brkic, et al., "Generative modeling of spatio-temporal traffic sign trajectories," Computer Vision and Pattern Recognition Workshops (CVPRW), Jun. 2010, 7 pages.
Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.
Bu, et al., "Efficient Anomaly Monitoring Over Moving Object Trajectory Streams," KDD 2009, Jun. 28-Jul. 1, 2009, 9 pages.
Cai, "Indexing Spatio-Temporal Trajectories with Chebyshev Polynomials", retrieved on Apr. 15, 2010 at <<http://www.cs.ubc.ca/~mg/psdepository/sigmod2004.pdf>>, ACM, Conference on Management of Data, Jun. 13-18, 2004, pp. 599-610.
Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.
Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen, et al., "GLS-SOD: A Generalized Local Statistical Approach for Spatial Outlier Detection," Proceedings of KDD 2010, Jul. 2010, pp. 1069-1078.
Chen, et al, "On the Marriage of Lp-norms and Edit Distance", Proceedings of Conference on Very Large Data Bases (VLDB), Aug. 29-Sep. 3, 2004, pp. 792-803.
Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.
Cranshaw, et al., "Bridging the Gap Between the Physical Location and Online Social Networks," In Proc. Ubicomp'10, Sep. 2010, pp. 119-128.
Das, et al., "Anomaly Detection and Spatio-Temporal Analysis of Global Climate System," Proceedings of SensorKDD '09, Jun. 2009, 9 pages.
Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.
Eagle, et al., "Community Computing: Comparisons between Rural and Urban Societies using Mobile Phone Data," Computational Science and Engineering, CSE '09, Aug 2009, 7 pages.
Eagle, et al., "Reality mining: sensing complex social systems," Personal and Ubiquitous Computing, vol. 10, Issue, 4, Mar. 2006, pp. 255-268.
Eagle et al, "Reality mining: sensing complex social systems", Springer-Verlag London, Personal and Ubiquitous Computing, vol. 10, Issue 4, Mar. 2006, pp. 255-268.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Estkowski, "No Steiner Point Subdivision Simplification is NP-Complete," In Proceedings of the 10th Canadian Conference on Computational Geometry, Jun. 1998, pp. 1-10.
Faloutsos et al, "Fast Subsequence Matching in Time-Series Databases," Proceedings of the 1994 ACM SIGMOD International Conference on Management of Data , vol. 23, No. 2, Jun. 1994, 11 pgs.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Ge, et al., "An Energy-Efficient Mobile Recommender System," In Proc. KDD '10, Washington, DC, Jul. 25-28, 2010, 9 pages.
Ge, et al., "TOP-EYE: Top-k Evolving Trajectory Outlier Detection," Proceedings of CIKM '10, Toronto, Canada, Oct. 26-30, 2010, 4 pages.
Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez et al, "Understanding individual human mobility patterns, Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, Jun. 2008, 18 pgs.
Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., Aug. 2005, pp. 121-146.
Ye, et al., "Mining Individual Life Pattern Based on Location History," Tenth International Conference on Mobile Data Management: Systems, Services and Middleware, May 18-20, 2009, Taipei, 10 pages.
Yi, et al, "Efficient Retrieval of Similar Time Sequences under Time Warping", IEEE Computer Society, Presentation: Proceedings of Conference on Data Engineering (ICDE), Feb. 1998, pp. 1-15.
Yuxiang, et al., "Detecting Spatio-temporal Outliers in Climate Dataset: A Method Study," IEEE, Proceeding of: Geoscience and Remote Sensing Symposium, IGARSS '05, Jul. 2005, pp. 760-763.

(56) References Cited

OTHER PUBLICATIONS

Zhang, et al, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 2004, pp. 384-393.

Zhang, et al., "iBAT: Detecting Anomalous Taxi Trajectories from GPS Traces," Proceedings of UbiComp, Sep. 2011, 10 pages.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhang, et al., "Network Anomography," USENIX Association, Internet Measurement Conference, Oct. 2005, pp. 317-330.

Zhao, et al., "Searching for Interacting Features", Proceedings of the 20th International Joint Conference on Artificial Intelligence, Hyderabad, India, Jan. 6-12, 2007, pp. 1156-1161.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages, retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.

Zheng, et al., "GeoLife: A Collaborative Social Networking Service among User, Location and Trajectory," IEEE Data (base) Engineering Bulletin, Jun. 2010, pp. 1-8, retrieved from <<http://sites.computer.org/debull/A10june/geolife.pdf>>.

Zheng, et al., "GeoLife: Managing and Understanding Your Past Life over Maps", IEEE Computer Society, In the Proceedings of the Ninth International Conference on Mobile Data Management, Apr. 2008, pp. 211-212.

Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.

Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.

Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.

Zheng et al., "GeoLife: Building social networks using human location history", Microsoft Research, Apr. 2009, 4 pages, retrieved on Apr. 16, 2010 at <<http://research.microsoft.com/en-us/projects/geolife/default.aspx>>.

Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.

Zheng, et al., "Recommending Friends and Locations Based on Individual Location History," In ACM Transactions on The Web, vol. 5, No. 1, Feb. 2011, pp. 1-44, <<http://research.microsoft.com/pubs/122435/RecomFriend-zheng-Published.pdf>>.

Zheng et al., "Recommending Friends and Locations Based on Individual Location History", ACM Trans. Asian Language Information Processing, vol. 6, No. 3, Article 9, Ch. 45, Nov. 2007, pp. 1-47, retrieved on Apr. 16, 2010 at <<http://research.microsoft.com/pubs/122435/Recommending%20friends%20and%20locations%20based%20on%20individual%20location%20history.pdf>>.

Zheng, et al., "Searching Your Life on Web Maps", Microsoft Research, available at <<http://research.microsoft.com/en-us/people/yuzheng/searching_your_life_over_web_maps.pdf>>, SIGIR Workshop on Mobile Information Retrieval, Jul. 2008, Singapore, 4 pgs.

Zheng, et al., "T-Drive: Driving Directions based on Taxi Trajectories," In Proceedings of ACM SIGSPATIAL Conference on Advances in Geographical Information Systems (ACM SIGSPATIAL GIS 2010), Nov. 2010, 10 pages, <<http://www.cse.unt.edu/~huangyan/6350/paperList/T-Drive.pdf>>.

Zheng, et al, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597& CFTOKEN=93582958, ACM Proceedings of Conference on Ubiquitous Computing (UbiComp), vol. 344, Sep. 2008, pp. 312-321.

Ziebart, et al., "Navigate Like a Cabbie: Probabilistic Reasoning from Observed Context-Aware Behavior," In Proc. Ubicomp 2008, Sep. 2008, pp. 322-331, <<http://citeseerx.ist.psu.edu/viewdoc/download?doi=10.1.1.141.7187&rep=rep1&type=pdf>>.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.

Lavondes, et al., "Geo::PostalAddress—Country-specific postal address parsing/formatting", retrieved on Dec. 16, 2008 at http://search.cpan.org/~pauamma/Geo-PostalAddress-0.04/PostalAddress.pm>>, CPAN, 2004, pp. 1-8.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carlo 8 Conference Proceedings (ASPRS and ACSM), 1987, pp. 754-763.

Saltenis, "Outlier Detection Based on the Distribution of Distances between Data Points", retrieved on Dec. 12, 2008 at <<http://www.mii.lt/informatica/pdf/INFO558.pdf>>, Informatica, vol. 15, No. 3, 2004, pp. 399-410'.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Office Action for U.S. Appl. No. 12/711,130, mailed on Oct. 4, 2012, Zheng et al., "Mining Correlation Between Locations Using Location History", 15 pages.

Office Action for U.S. Appl. No. 12/712,053, mailed on Aug. 15, 2012, Zheng et al., "Route Computation Based on Route-Oriented Vehicle Trajectories", 17 pages.

Tai et al., "Recommending Personalized Scenic Itinerary with Geo-Tagged Photos", ICME, Jun. 2008, 4 pages.

Office Action for U.S. Appl. No. 12/773,771, mailed on Mar. 26, 2012, Yu Zheng, "Collaborative Location and Activity Recommendations", 9 pgs.

Office Action for U.S. Appl. No. 12/711,130, mailed on Mar. 27, 2012, Yu Zheng, "Mining Correlation Between Locations Using Location History", 14 pgs.

Office Action for U.S. Appl. No. 12/567,667, mailed on Jul. 18, 2012, Zheng et al., "Recommending Points of Interests in a Region", 20 pages.

European Search Report mailed Nov. 21, 2012 for European patent application No. 09714738.3, 9 pages.

Office action for U.S. Appl. No. 13/324,758, mailed on Jan. 18, 2013, Zheng et al., "Urban Computing of Route-Oriented Vehicles", 48 pages.

(56) References Cited

OTHER PUBLICATIONS

Office action for U.S. Appl. No. 12/794,538, mailed on Nov. 29, 2012, Zheng et al. "Searching Similar Trajectories by Locations", 10 pages.
Office action for U.S. Appl. No. 12/567,667, mailed Dec. 19, 2012, Zheng et al., "Recommending Points of Interests in a Region", 18 pages.
Shiraishi, "A User-centric Approach for Interactive Visualization and mapping of Geo-sensor Data", Networked Sensing Systems, 2007, INSS, Fourth International Conference on IEEE, Jun. 1, 2007, pp. 134-pp. 137.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-pp. 79.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-pp. 211.
Weng et al., "Design and Implementation of Spatial-temporal Data Model in Vehicle Monitor-System", Proceeding of the 8th International Conference on Geocomputation, Aug. 3, 2005, pp. 1-8.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Eustice et al, "The Smart Party: A Personalized Location Aware Multimedia Experience", Consumer Communications and Networking Conf, Jan. 2008, 5 pgs.
GPS Sharing, retrieved Feb. 4, 2013 at http://web.archive.org/web/20071129224158/http://gpssharing.com, 2 pgs.
Hariharan et al, "NetTrust—Recommendation System for Embedding Trust in a Virtual Realm", ACM Recommender Systems, Oct. 2007, 6 pgs.
Intl Search Report for PCT/US2009/063023, mailed Jun. 10, 2010, 4 pgs.
Jarvelin et al, "Cumulated Gain Based Evaluation of IR Techniques", ACM Transactions on Information Systems, vol. 20, No. 4, Oct. 2002, 25 pgs.
Jones et al, "P3 Systems: Putting the Place Back into Social Networks", IEEE Internet Computing, Sep.-Oct. 2005, 9 pgs.
Lee et al, "Efficient Mining of User Behaviors by Temporal Mobile Access Patterns", Intl Journal of Computer Science and Network Security, vol. 7, No. 2, Feb. 2007, 7 pgs.
Linden et al, "Amazon.com Recommendations, Item to Item Collaborative Filtering", IEEE Internet Computing, Jan. and Feb. 2003, 5 pgs.
Matsuo et al, "Inferring Long Term User Properties Based on Users' Location History", Proc 20th Intl Joint Conf on Artificial Intelligence, Jan. 2007, 7 pgs.
McDonald et al, "Expertise Recommender: A Flexible Recommendation System and Architecture", CSCW 2000, Dec. 2000, 10 pgs.
Michael et al, "Location Based Intelligence—Modeling Behavior in Humans Using GPS", Proc Intl Symposium on Technology and Society, Jun. 2006, 8 pgs.
Sarwar et al, "Application of Dimensionality Reduction in Recommender System, A Case Study", ACM WebKDD Workshop, Aug. 2000, 12 pgs.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Xie, "Understanding User Behavior Geospatially", Microsoft Research, Nov. 2008, 2 pgs.
Ge et al., "An Energy-Efficient Mobile Recommender System", KDD, Jul. 2010, 9 pages.
Office action for U.S. Appl. No. 12/712,857, mailed on Aug. 5, 2013, Zheng, et al., "Map-Matching for Low Sampling-Rate GPS Trajectories", 15 pages.
Office action for U.S. Appl. No. 13/324,758, mailed on Jul. 11, 2013, Zheng et al., "Urban Computing of RouteOriented Vehicles", 47 pages.
Office action for U.S. Appl. No. 12/794,538, mailed on Sep. 18, 2013, Zheng, et al., "Searching Similar Trajectories by Locations", 12 pages.
Liao, et al. "Learning and inferring transportation routines", Artificial Intelligence, vol. 171, Apr. 2007, pp. 311-331.
Office action for U.S. Appl. No. 12/037,347, mailed on Jan. 13, 2014, Zheng, et al., "System for Logging Life Experiences Using Geographic Cues", 8 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Domain Name System (DNS), retrieved on Apr. 29, 2008 at <<http://www.unix.org.ua/orelly/networking/firewall/ch08_10.htm, Unix, pp. 1-11.
Domain Name System (DNS) a Guide to TCP/IP, retrieved Apr. 29, 2008 at <<http://web.syr.edu/~djmolta/ist452/ch_07.ppt>>, Thomson Learning Course Technology, pp. 1-56.
"Flow Control Platform (FCP) Solutions", retrieved Jul. 5, 2007 at <<http://k2colocation.com/network-services/fcp.cfm>>, K2 Colocation, 2005, pp. 2.
"Global Server Load Balancing for Disaster Recovery, Business Continuity, Performance Optimization and Datacenter Management", retrieved Jul. 6, 2007 at <<http://www.zeus.com/documents/en/ZXT/ZXTM_Global_Load_Balancer.pdf>>, Zeus Technology Limited, 1995-2007, pp. 4.
Linden, "The End of Federated Search?", at <<http://glinden.blogspot.com/2007/03/end-of-federated-search.html>>, Mar. 24, 2007, pp. 9.
Office Action for U.S. Appl. No. 12/041,599, mailed on Jul. 25, 2011, Arne Josefsberg, "Failover in an Internet Location Coordinate Enhanced Domain Name System".
Office action for U.S. Appl. No. 13/188,013, mailed on Nov. 15, 2011, Josefsberg et al., "Internet Location Coordinate Enhanced Domain Name System", 14 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office action for U.S. Appl. No. 12/041,599, mailed on Sep. 21, 2012, Josefsberg et al., "Failover in an Internet Location Coordinate Enhanced Domain Name System", 9 pages.
Park, et al., "CoDNS: Improving DNS Performance and Reliability via Cooperative Lookups", Proc 6th conf on Symposium on Operating Systems Design and Implementation, vol. 6, Dec. 2004, pp. 1-16.
Wikipedia, "Operating System", retrived from <<http://en.wikipedia.org/wiki/Operating_system>> on Oct. 8, 2010, 17 pgs.
Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.
Office action for U.S. Appl. No. 12/712,857, mailed on Feb. 21, 2014, Zheng, et al., "Map-Matching for LowSampling-Rate GPS Trajectories", 15 pages.
Office action for U.S. Appl. No. 12/567,667, mailed on Feb. 25, 2014, Zheng et al., "Recommending Points of Interests in a Region", 31 pages.
Office action for U.S. Appl. No. 12/794,538, mailed on Apr. 22, 2014, Zheng, et al., "Searching Similar Trajectories by Locations", 38 pages.
Office Action for U.S. Appl. No. 12/712,857, mailed on Jun. 6, 2014, Yu Zheng, "Map-Matching for Low-Sampling-Rate GPS Trajectories", 14 pages.
Office action for U.S. Appl. No. 12/712,053, mailed on Jun. 6, 2014, Zheng et al., "Route Computation Based on Route-Oriented Vehicle Trajectories", 24 pages.
Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.
Breiman, "Bagging Pedictors", Machine Learning, vol. 24, No. 2, Aug. 1996, pp. 123-140.

(56) References Cited

OTHER PUBLICATIONS

Chen, et al., "GeoTracker Geospatial and Temporal RSS Navigation", WWW2007, May 2007, pp. 41-50.
"CRF++: Yet Another CRF Toolkit", retrieved on Jan. 18, 2008 from <<http://crfpp.sourceforge.net>>, 13 pages.
Hadjieleftheriou, et al., "Complex Spatio-Temporal Pattern Queries", Proceedings of the 31st VLDB Conference, Sep. 2005, pp. 877-888.
Hadjieleftheriou, et al., "Efficient Indexing of Spatiotemporal Objects", Proceedings of the 8th International Conference on Extending Database Technology: Advances in Database Technology, Mar. 2002, 10 pages.
Han, et al., "Predicting User' Movement with a Combination of Self-Organizing Map and Markov Model", ICANN 2006, Part II, LNCS 4132, Sep. 2006, pp. 884-893.
International Preliminary Report on Patentability cited in PCT Application No. PCT/US2009/032777 dated Sep. 10, 2010, 6 pages.
Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.
International Search Report and Written Opinion Received for PCT Application No. PCT/US2009/0327777, mailed Aug. 26, 2009, 10 pages.
International Search Report dated Aug. 19, 2009 for PCT Application No. PCT/US2009,032778, filed Jan. 31, 2009, 11 pages.
Lafferty, et al., "Conditional Random Fields: Probabilistic Models for Segmenting and Labeling Sequence Data", Proceedings of the 18th International Conference on Machine Learning, Jun. 2001, 8 pages.
Mitchell, et al., "Six in the City: Introducing Real Tournament—A Mobile IPv6 Based Context-Aware Multiplayer Game", NetGames'03, May 2003, pp. 91-100.
"North York Moors and Yorkshire Wolds Mountain Bke (MTB) Routes", retrieved on Jan. 17, 2008 from <<http:// www.mtb-routs.co.uk/northyorkmorrs/default.aspx>>, 4 pages.
Non-Final Office Action for U.S. Appl. No. 12/041,608, mailed on Jun. 25, 2014, Josefsberg, et al., "Client-Side Management of Domain Name Information", 4 pages.
Final Office Action for U.S. Appl. No. 12/567,667, mailed on Aug. 27, 2014, Yu Zheng, "Recommending Points of Interests in a Region", 7 pages.
"SIamXR List Routes Page By Microsoft Research Community Technologies Group", retrieved on Jan. 18, 2008 from <<http://www.msslam.com/slamxr/ListRoutes.aspx>, 2 pages.
"SportsDo", retrieved on Jan. 17, 2008 from <<http://sportsdo.net/Activity/ActivityBlog.aspx>>, 3 pages.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
"Twittervision", retrieved on Jan. 18, 2008 from <<http://twittervision.com>>, 1 page.
Wasinger, et al., "M3I in a Pedestian Navigation & Exploration System", Proceedings of the Fifth International Symposium on Human Computer Interaction with Mobile Devices, Sep. 2003, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.
"Weka 3: Data Mining Software in Java", retreived on Jan. 18, 2008 from <<http://www.cs.waikato.ac.nz/ml/weka/index_home.html>>, 1 page.
"Welcome to WalkJogRun", retreived on Jan. 17, 2008 from <<http://www.walkjogrun.net>>, 1 page.
"WikiWalki Community Trail Guide", retrieved on Jan. 17, 2008 from <<http://www.wikiwalki.com>>, 1 page.
Zhang, et al., "Research on Information Fusion on Evaluation of Driver Fatigue", 2008 International Symposium on Computer Scientc and Computational Technology, Dec. 2008, pp. 151-155.
Office action for U.S. Appl. No. 12/712,857, mailed on Jan. 6, 2015, Zheng, et al., "Map-Matching for Low-Sampling-Rate GPS Trajectories", 15 pages.
Office Action for U.S. Appl. No. 13/324,758, mailed on Dec. 24, 2014, Zheng et al., "Urban Computing of Route-Oriented Vehicles", 54 pages.
Office action for U.S. Appl. No. 12/712,053, mailed on Mar. 10, 2015, Zheng et al., "Route Computation Based on Route-Oriented Vehicle Trajectories", 22 pages.
Office action for U.S. Appl. No. 12/794,538, mailed on Mar. 23, 2015, Zheng et al., "Searching Similar Trajectories by Locations", 8 pages.

* cited by examiner

DETECTING SPATIAL OUTLIERS IN A LOCATION ENTITY DATASET

BACKGROUND

With the wide availability of wireless and satellite connections to online services, users are increasingly relying on location search services to find destinations. Services such as Windows Local Live Search™ often provide users with traditional maps of locations, aerial photographs of those same locations, and/or combinations of photographs and maps.

In addition, the services often annotate these maps and photographs with identifiers for landmarks, businesses, and/or other points of interest. These annotations are often drawn from large datasets of location entities. The location entities are in turn often classified as "point of interest" (POI) entities or "yellow page" (YP) entities. POI entities are often created by users with mobile, GPS-enabled devices. Accordingly, the GPS coordinates for such entities tend to have a high degree of accuracy. Other fields of POI entities (e.g., name, address, etc.), however, tend to be less accurate as the entity-creating user may not enter those fields with a great degree of care. YP entities are often created by the businesses or locations that they identify, and may be captured for the dataset by, for example, crawling the Internet. Because YP entities are often created by businesses or locations having a strong desire to be found, name and address fields of the entities may be highly accurate. GPS coordinates for YP entities are then geo-coded based on the address field and vary in quality based on the accuracy of the address field.

These large datasets often include a number of entities with erroneous location information, resulting in location identifiers being placed on maps at the wrong locations. While location entities with erroneous location information may be manually located and deleted, doing so can be time and labor intensive.

SUMMARY

In various embodiments, a computing device is configured to arrange a plurality of location entities into a hierarchy of location descriptors. The computing device may further process determine whether one of the location entities is a spatial outlier based at least in part on presence of one or more other location entities within a predetermined distance of the one location entity. Also, the other location entities and the one location entity may share a location descriptor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF DRAWINGS

Non-limiting and non-exhaustive examples are described with reference to the following figures.

DETAILED DESCRIPTION

Overview

Figure 1:
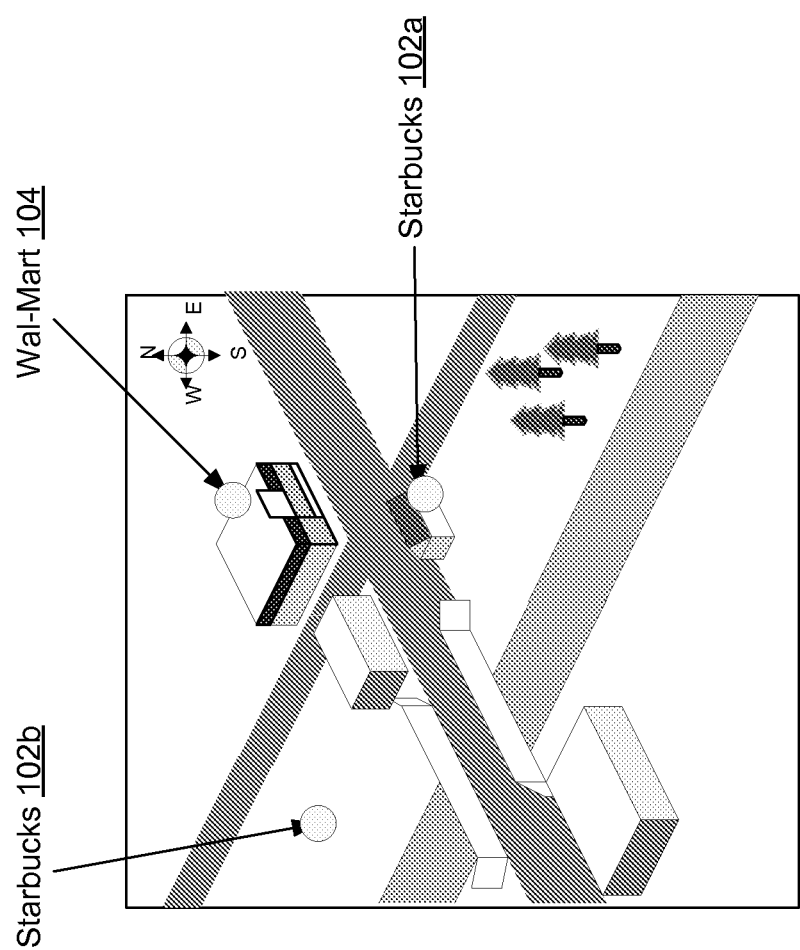
FIG. 1 illustrates an overview of location dataset analysis, in accordance with various embodiments.

FIG. 1 illustrates an overview of location dataset analysis, in accordance with various embodiments. As shown, a map or aerial photograph may include identifiers for a plurality of locations, such as identifiers 102a, 102b, and 104. The identifiers may correspond to location entities retrieved or received from a location dataset. The location entities may include either or both of "point of interest" (POI) and "yellow page" (YP) entities.

Unless the context indicates otherwise, a POI entity, as used herein, refers to a location entity having a GPS coordinate field, the GPS coordinates having been captured by a GPS-enabled device. Also, unless the context indicates otherwise, a YP entity, as used herein, refers to a location entity for which at least an address field has been manually entered (or copied from a manually entered address) and GPS-coordinates have been geo-coded based on the address. A POI entity may also have a manually entered address, but a YP entity is often created by a business, thus providing an incentive for a more accurate recording of the address.

In FIG. 1, both identifiers 102a and 102b refer to location entities named "Starbucks." Identifier 104 refers to a location entity named "Wal-mart." Visual inspection of the map seems to confirm the accuracy of identifiers 102a and 104, and call into question the accuracy of identifier 102b, which appears to point to an empty field despite being associated with the name "Starbucks." Accordingly, Starbucks may be a "spatial outlier." A spatial outlier, as used herein, is a location entity having measurably erroneous location information.

Figure 2:
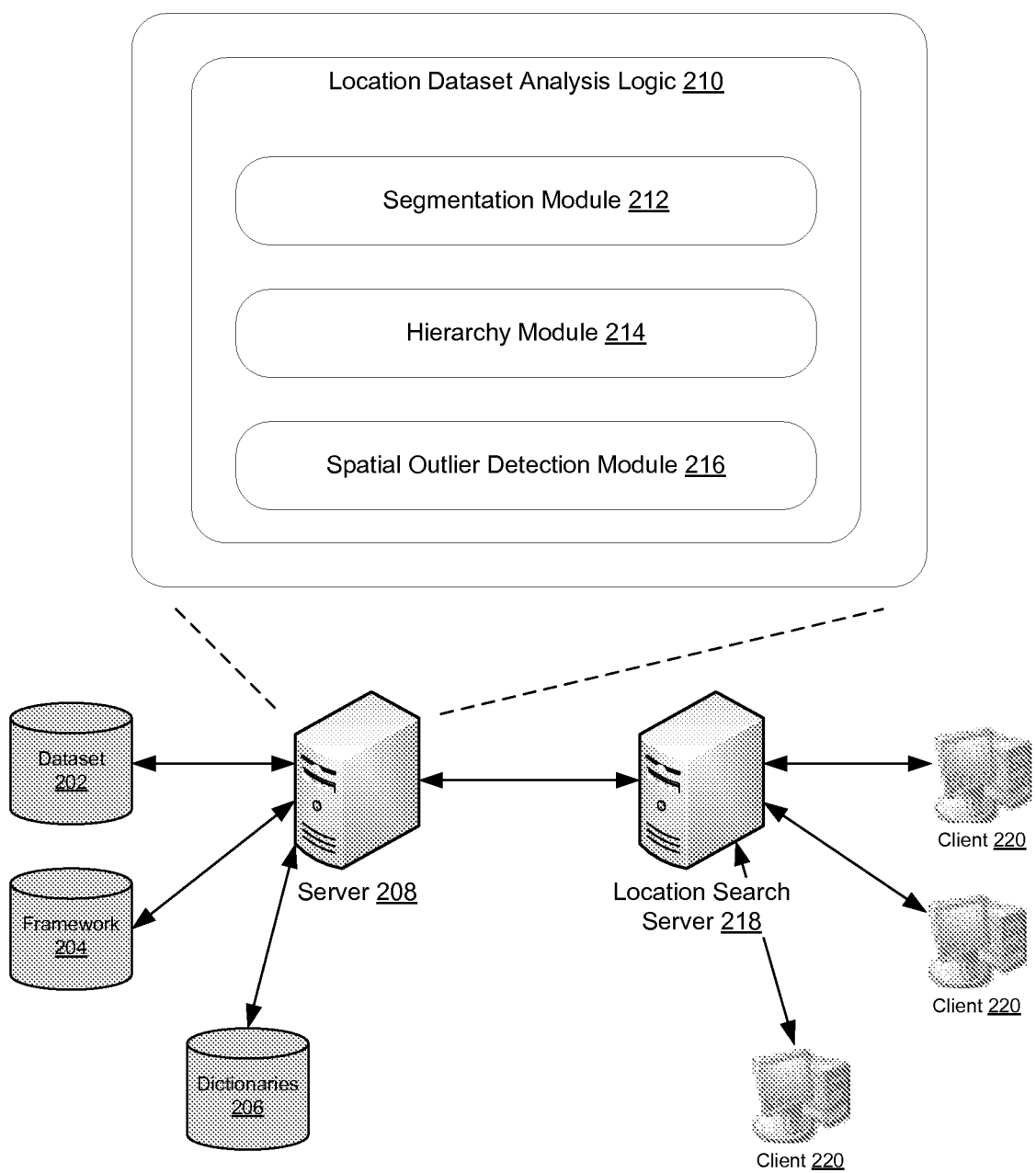
FIG. 2 an exemplary operating environment including a computing device programmed with location dataset analysis logic, in accordance with various embodiments.

To determine whether identifier 102b is a spatial outlier, a computing device programmed as shown in FIG. 2 and described below may perform a location dataset analysis on a plurality of location entities, including the location entity corresponding to identifier 102b. The computing device may arrange the location entities into a hierarchy of location descriptors and determine whether the location entity for identifier 102b is a spatial outlier based at least in part on presence of one or more other location entities within a predetermined distance of the location entity for identifier 102b. The other location entities and the location entity for identifier 102b may share a location description. If the location entity for identifier 102b is determined to be a spatial outlier, that location entity may be deleted and identifier 102b may not be rendered to a user as part of the map or aerial photograph.

Exemplary Operating Environment

FIG. 2 is a block diagram illustrating an exemplary operating environment, in accordance with various embodiments. More specifically, FIG. 2 shows a computing device 208 that is programmed to perform a location dataset analysis for location entities of a dataset 202. In some embodiments, the computing device 208 may further retrieve or generate a framework 204 and/or one or more dictionaries 206. The framework 204 may be used to segment addresses of location entities and to arrange the location entities into a hierarchy of location descriptors. The dictionaries 206 may also be used to segment the addresses of the location entities. To perform the location dataset analysis, computing device 208 may have location dataset analysis logic 210. The location dataset analysis logic 210 may in turn include a plurality of modules, such as segmentation module 212, hierarchy module 214, and spatial outlier detection module 216. As mentioned above, the location dataset analysis logic 210 may detect and delete spatial outlier location entities from the dataset 202. A location search server 218 may then be receive the resulting dataset, the dataset to be served with maps to clients 220.

In various embodiments, dataset 202 may be any sort of file storing a plurality of location entities. For example, dataset 202 may be a database file, a text file, or an XML file. In some embodiments, dataset 202 may be stored on a database server (not shown) that is separate and distinct from the computing device 202, or on some other server or computing device. In other embodiments, dataset 202 may be stored on computing device 208. Additionally, dataset 202 may comprise POI and YP location entities. An exemplary location entity may include fields for a location name, an address, a GPS position, a phone number, a category, and/or a type (e.g., POI or YP). A dataset 202 having two location entities is illustrated in Table 1:

TABLE 1

| Name | Address | GPS Position | Phone Num. | Category | Type |
| --- | --- | --- | --- | --- | --- |
| Starbucks | 7001 5$^{th}$ Ave Seattle, WA | 116.325, 35.364 | 1-56987452 | Café | YP |
| Silver Cloud Inn | 3014 7$^{th}$ Ave Redmond, WA | 116.451, 35.209 | 1-25698716 | Restaurant | POI |

Figure 4:
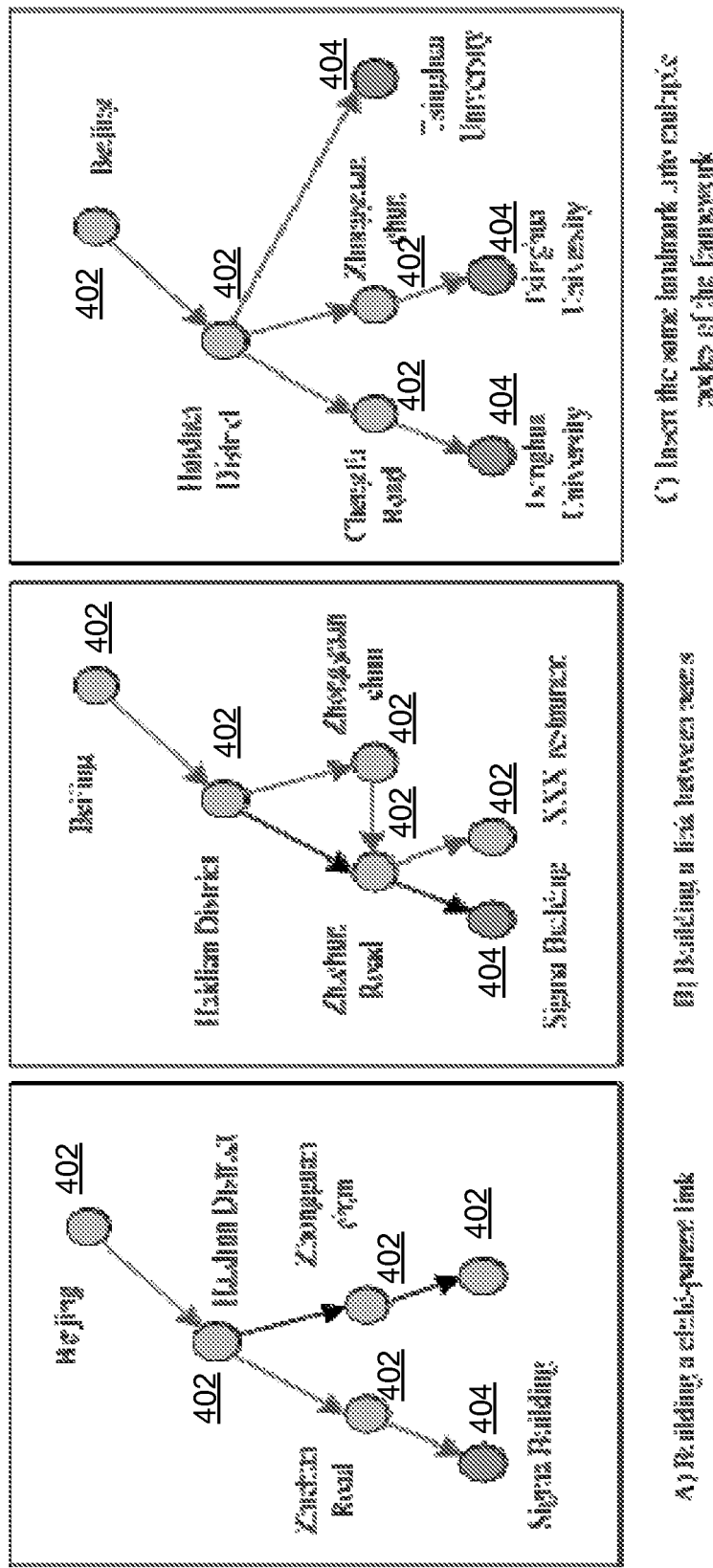
FIG. 4 illustrates a number of exemplary hierarchies of location descriptors, in accordance with various embodiments.
Figure 5:
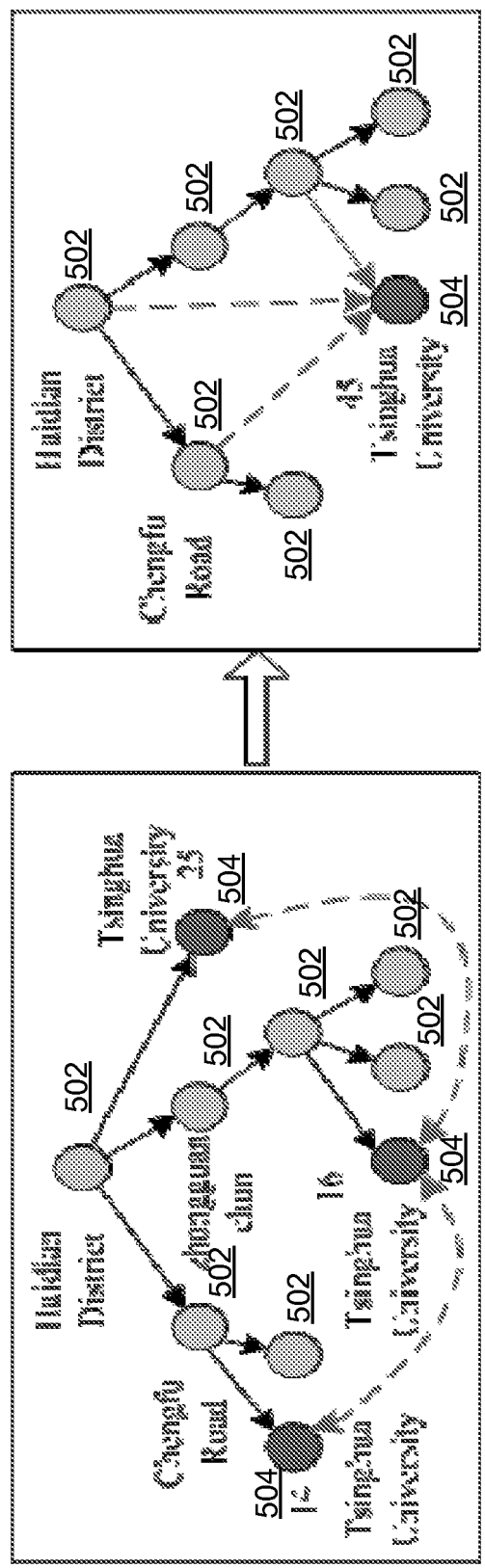
FIG. 5 illustrates the merging of location descriptors for location entities determined to refer to the same instance, in accordance with various embodiments.

In various embodiments, framework 202 may be a hierarchical tree structure of location descriptors. For example, framework 202 may have a location descriptor for a city as the root node, location descriptors for districts as the nodes for the next level, location descriptors for streets as the nodes for the third level, and location descriptors for buildings in the fourth level. In some embodiments, levels of the framework 202 may include multiple descriptor types (i.e., the second level may contain district nodes and a landmark node). FIGS. 4 and 5 illustrate exemplary frameworks 204 after the insertion of nodes for location entities. For example, picture A) in FIG. 4 illustrates a framework with a root node labeled "Beijing", a second level node labeled "Haidian District", and third level nodes labeled "Zhichun Road" and "Zhongguan chun".

In various embodiments, computing device 208 may create the framework 204 based on layout information for a city. For example, some cities may publish a file having layout information, and computing device 208 may build the hierarchical tree of framework 204 based on the layout information. In such embodiments, the framework 204 may be stored on computing device 208. In other embodiments, framework 204 may be generated by another computing device and/or stored on another computing device, such as a storage server.

As further illustrated in FIG. 2, computing device 208 may also utilize one or more dictionaries 206. In some embodiments, dictionaries 206 may include a breaker words dictionary and a category words dictionary. Either dictionary 206 may be of any file format known in the art, such as a database file, a text file, or an XML file. The breaker words dictionary 206 may include words or phrases indicating a break between location descriptors comprising an address. For example, in the address "Chow restaurant, 200 meters from the Sigma building, Yi Ping Road, Beijing", "200 meters from" may be a breaker word, indicating a break between the location descriptors "Chow Restaurant" and "Sigma Building". Other exemplary breaker words may include "turn left", "on the north side of", etc. In some embodiments, one or more users of one or more computing devices may manually generate the breaker words dictionary 206. The breaker words dictionary may be stored on computing device 208 or on some other computing device, such as a storage server.

In various embodiments, category words dictionary 206 may include words or phrases derived from name or category fields of location entities. For example, category words may include such words or phases as "restaurant", "company", or "shopping mall." In some embodiments, category words dictionary 206 may be manually generated, automatically generated based on names or categories of location entities, or both. If manually generated, one or more users of one or more computing devices may create or contribute to the document including the category words. If automatically generated, computing device 208 or some other computing device may process the location entities 208 to extract category words. In some embodiments, the computing device 208 or other device may extract a plurality of n-grams from the name and/or category fields of the location entities and evaluate those n-grams utilizing n-gram algorithms known in the art, selecting n-grams as category words that occur with a pre-defined frequency within dataset 202.

Figure 7:
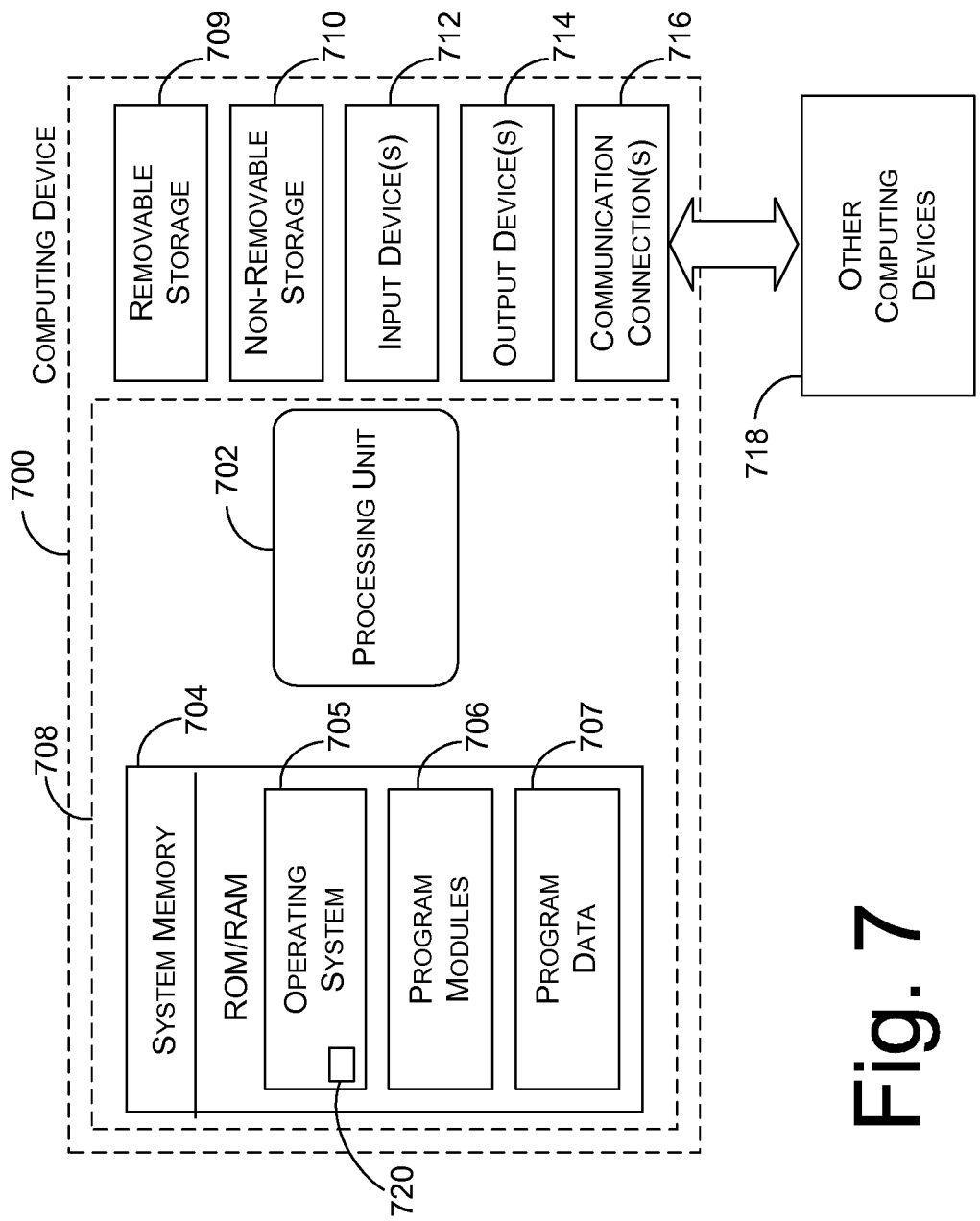
FIG. 7 is a block diagram of an exemplary computing device.

As shown in FIG. 2, computing device 208 may be any sort of computing device or devices known in the art, such as personal computers (PCs), laptops, servers, phones, personal digital assistants (PDAs), set-top boxes, and data centers. In some embodiments, the computing device 208 may be a particular machine configured to perform some or all of the location dataset analysis operations described above and below. As shown, computing device 208 may be programmed with location dataset analysis logic 210 and may thus be capable of detecting and deleting spatial outlier location entities from dataset 202 and providing the modified dataset 202 to a location search server 218. Computing device 208 may further be configured to receive, retrieve, or generate any or all of dataset 202, framework 204, and/or dictionaries 206, either as they are generated, at pre-determined times, or in response to a user command or request. FIG. 7 and its corresponding description below illustrate an exemplary computing device 208 in greater detail.

Also, in some embodiments, computing device 208, location search server 218, clients 220, and/or device(s) storing any or all of dataset 202, framework 204, or dictionaries 206 may be connected by at least one networking fabric (not shown). For example, the device 208 and server 218 may be connected by a local access network (LAN), a public or private wide area network (WAN), and/or by the Internet. In some embodiments, the devices may implement between themselves a virtual private network (VPN) to secure the communications. Also, the devices may utilize any communications protocol known in the art, such as the Transmission Control Protocol/Internet Protocol (TCP/IP) set of protocols. In other embodiments, rather than being coupled by a networking fabric, the devices may be locally or physically coupled.

As is further illustrated in FIG. 2, computing device 208 may include and be programmed with location dataset analysis logic 210 (hereinafter "logic 210"). Logic 210 may be any set of executable instructions capable of performing the operations described below with regard to modules 212-216.

Logic 210 may reside completely on computing device 208, or may reside at least in part on one or more other computing devices and may be delivered to computing device 208 via the above-described networking fabric. While logic 210 is shown as comprising concept segmentation module 212, hierarchy module 214, and spatial outlier determination module 216, logic 210 may instead comprise more or fewer modules collectively capable of performing the operations described below with regard to modules 212-216. Thus, modules 212-216 are shown and described simply for the sake of illustration, and all operations performed by any of the modules 212-216 are ultimately operations of logic 210 that may be performed by any sort of module of logic 210.

In various embodiments, segmentation module 212 may segment an address field of a location entity into a plurality of location descriptors. For example, if the address of a location entity is "4F Sigma Building, No. 49 Zhichun Road, Haidian District, Beijing", then segmentation module 212 may segment the address into four phrases/descriptors: Beijing, Haidian District, Zhichun Road, and Sigma Building. In some embodiments, segmentation module 212 may operate to determine the segmentation by finding word delimiters, such as commas, or other grammatical symbols. Each delimiter or symbol may be regarded as separating two location descriptors. For an address with N delimiters or symbols, there may be N+1 location descriptors/phrases. In some embodiments, in addition to extracting phrases/descriptors, segmentation module 212 may filter out information such as street or suite numbers. Thus, for example, segmentation module 212 may filter "4F" from "4F Sigma Building", leaving "Sigma Building" as the location descriptor. Also, in some embodiments, segmentation module 212 may filter out words that match entries in the breaker words or category words dictionaries 206 from the location descriptors.

In other embodiments, segmentation module 212 may instead segment addresses of location entities based at least in part on framework 204 and dictionaries 206. For example, in other languages, such as Chinese, delimiters or symbols do not separate the terms of an address. Thus, some other mechanism of separating the terms into location descriptors is required. In various embodiments, segmentation module 212 may separate an address into words/descriptors by comparing the address to the contents of the framework 204 and dictionaries 206. For example, framework 204 may contain a root node associated with the location descriptor "Beijing." The address of the location entity under evaluation by segmentation module 212 may also include the word Beijing. Upon finding a match, the segmentation module 212 may consider the word "Beijing" a location descriptor for the location entity. Also, if segmentation module 212 finds a match between a portion of the address and the breaker words dictionary (e.g., turn left), it may consider the words on either side of the breaker word to be candidate words/descriptors. Further, the segmentation module 212 may compare the address of a location entity to words contained in the category words dictionary 206. If a match is found, such as "building", the segmentation module 212 may consider the matching word to be a delimiter, as category words are often the last word or words in any portion of an address.

In some embodiments, the segmentation module 212 may then filter out words that match entries in the breaker words or category words dictionaries 206 from the determined location descriptors, as well as street numbers, etc. After filtering, for any portion of the address that has not yet been matched and is over a certain threshold length (e.g., 5 Chinese characters), the segmentation module 212 may attempt to split that portion. Other unmatched portions that are smaller than the threshold length may be considered location descriptors. To split an address portion with a length exceeding the threshold length, the segmentation module 212 may again compare the portion to the framework 204 to determine of any sub-portion matches the framework 204. If a match is found, the segmentation module 212 may consider the sub-portion a location descriptor and may again filter and split the remaining portion, if necessary. If a match is not found, then the segmentation module 212 may consider the portion of the address a location descriptor.

In various embodiments, hierarchy module 214 may arrange the location entities into a hierarchy of location descriptors, such as framework 204, as mentioned above. To arrange the descriptors derived from the address by the segmentation module 212 into the framework 204, hierarchy module 214 may start with the broadest descriptor, such as a city name, and determine if it is present in the framework. The broadest descriptor may be the last descriptor that appears in an address, if the address is in English, or the first descriptor in an address, if the address is in Chinese. If not descriptors are found in the framework 204 (i.e., the framework 204 is empty), then the broadest descriptor may be added as a root node. The hierarchy module 214 may then repeat the determining of whether each descriptor is present in the framework 204 until the narrowest descriptor is reached. For each descriptor not found in the framework 204, hierarchy module 214 may add it as a child node of a parent node that corresponds to the next broadest descriptor in the same address. For example, if an address include the fragment "Zhichun Road, Haidian District", and "Haidian District" is present in the framework and "Zhichun Road" is not, then hierarchy module 214 may add "Zhichun Road" as a child node of "Haidian District." If the narrowest descriptor is already present in the framework 204, then the hierarchy module 214 may associate the node for the narrowest descriptor with the location entity containing that descriptor, in some embodiments by a pointer or index to the location entity. In various embodiments, the narrowest descriptor may often correspond to a leaf node of framework 204.

In various embodiments, FIG. 4 illustrates several exemplary insertions of location descriptors into frameworks 204. In picture A), a location entity having the descriptors "Sigma Building, Zhichun Road, Haidian District, Beijing" is inserted into the framework 204. Hierarchy module 214 may compare the descriptors of the address of the location entity to the framework 204 and determine that only the narrowest descriptor, "Sigma Building", is not present in the framework 204. Hierarchy module 214 may then add a Sigma Building node 404 as a child node of the node 402 for the next broadest descriptor, Zhichun Road, and associate the location entity being inserted with the Sigma Building node 404.

Further illustrated in FIG. 4 in picture B), sometimes a location entity may contain two descriptors at the same level in the framework 204. For example, "Zhichun Road" and "Zhongguan chun" appear as nodes 402 at the same level of the framework 204. They are peers rather than parent and child. An address of a location entity, however, because of an error or other reason, may include them in sequence, suggesting a parent-child relationship. When hierarchy module 214 encounters this situation, it may add an edge between the peer nodes 402, the edge pointing from the node 402 in the "broader" position in the address to the node 402 in the "narrower" position.

Again referring to FIG. 4, in Picture C), sometimes the same narrowest descriptor for a plurality of different location entities may be inserted at a plurality of different locations in the framework 204. For example, three different location entities sharing the same narrowest location descriptor, "Tsinghua University", may each have an address field comprised of different sets of descriptors. A first may have "Tsinghua University, Beijing." A second may have "Tsinghua University, Chengfu Road, Haidian District, Beijing." A third may have "Tsinghua University, Zhongguan chun, Haidian District, Beijing." In evaluating these sets of descriptors, hierarchy module 214 may insert a node 404 for the narrowest descriptor multiple times in multiple places because of the different parent-child relationships implied by the descriptors.

In various embodiments, after inserting descriptors for the location entities, the hierarchy module 214 may merge nodes/descriptors which refer to the same instance. For example, referring to FIG. 4 picture C), the three Tsinghua University nodes may actually all refer to the same, physical Tsinghua University. Before merging descriptors, however, hierarchy module 214 must determine whether the descriptors refer to the same instance. If there are ten descriptors for "Starbucks", they may well refer to several different physical Starbucks locations. To determine whether multiple location descriptors refer to the same instance, hierarchy module 214 may determine the frequency with which the location descriptor occurs as a child node of a common parent node. If the frequency exceeds a pre-defined threshold, the hierarchy module 214 may determine that the descriptors refer to the same instance. For example, in FIG. 5, the descriptor "Tsinghua University" is shown as occurring as a child node 504 of the "Beijing" node 502 twenty-five times. If the threshold is, for example, twenty occurrences, then hierarchy module 214 will consider all descendent nodes of Beijing referring to Tsinghua University to refer to the same instance.

In some embodiments, hierarchy module 214 may then determine the number of location entities associated with each node having the descriptor to be merged. For example, eight location entities may be associated with the node "Tsinghua University" that is a child of "Chengfu Road". In other words, eight location entities may share this same set of location descriptors. Hierarchy module 214 may then select the node with the lowest level in framework 204 whose number of associated location entities exceeds a pre-determined threshold. Continuing with the example above, there may be a lower level node for Tsinghua University (e.g., "Tsinghua University, Fudan Campus, Chengfu Road"), but that lower level node may only be associated with, for example, three location entities. If the threshold is seven, then hierarchy module 214 may select the node associated with the eight location entities. Hierarchy module 214 may then retain the selected node and delete the other nodes sharing the location descriptor, effectively combining the nodes. In combining the nodes, hierarchy module 214 may add edges from the parent nodes of the nodes being deleted to the node being retained, and may associate the location entities of the nodes being deleted to the node being retained. For example, FIG. 5 illustrates the lowest level node 504 being retained, and other nodes 504 being deleted. Also, edges are shown being added from each of the parent nodes 502 of deleted nodes 504 to the retained node 504.

As is further illustrated in FIG. 2, the spatial outlier determination module 216 (hereinafter "outlier module 216") may determine whether a given entity is a spatial outlier based at least in part on presence of one or more other location entities within a predetermined distance of the one location entity, the other location entities and the one location entity sharing a location descriptor. To determine whether a location entity is a spatial outlier, outlier module 216 may apply at least one of a D-P algorithm or a POI-based algorithm.

In various embodiments, if performing the D-P algorithm, the outlier module 216 may first determine a reference set for a location entity. The reference set may include other location entities associated with the same node of framework 204, the same parent node, and/or a same ancestor node. Based on the set selected, outlier module 216 may further determine or select a distance d and a number p of other location entities expected to be within that distance. In one embodiment, the outlier module 216 may calculate the distance d by determining a box which includes the geographic area of the common node for the set. If the common node is the same node, the box may be small, and if the common node is an ancestor node, the box may be large. The outlier module 216 may then multiply a diagonal of the box by a predetermined percentage (e.g., 10%), and may assign the resulting value to the distance d. In some embodiments, outlier module 216 may calculate p by determining the total number of location entities in the reference set and multiplying that total number by a predetermined fraction (e.g., ¼). Once d and p have been selected or calculated, the outlier module 216 may determine the number of location entities from the reference set that are within the distance d of the location entity being evaluated. In performing this determining, the outlier module 216 may utilize the GPS coordinates of each location entity. If that number does not meet or exceeds p, the outlier module 216 may deem the location entity a spatial outlier.

Figure 6:
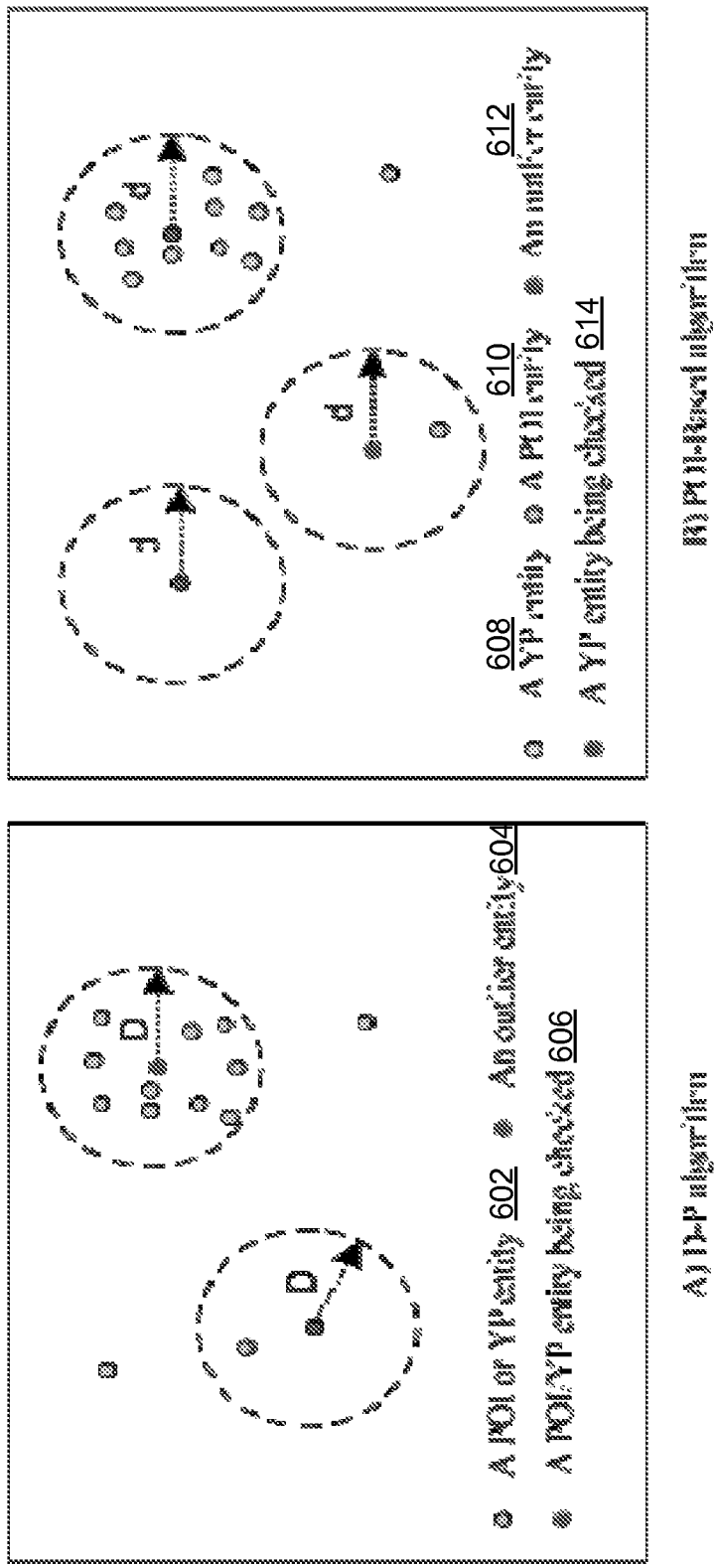
FIG. 6 illustrates exemplary methods of determining spatial outliers, in accordance with various embodiments.

FIG. 6 illustrates the D-P algorithm in further detail. As shown, the outlier module 216 may compare a location entity being checked 606 (which may be either a POI or YP entity) to other location entities 602 comprising a reference set. If the number of location entities 602 within the distance d of entity 606 does not meet or exceed p, then outlier module 216 may deem entity 606 a spatial outlier 604.

In various embodiments, the outlier module 216 may only perform the POI-based method if the entity being checked is a YP entity. If performing the POI-based algorithm, the outlier module 216 may first determine a reference set for the YP entity, the reference set including only POI entities. The reference set may include POI location entities associated with the same node of framework 204, the same parent node, and/or a same ancestor node as the YP entity being checked. Based on the set selected, outlier module may further determine or select a distance d. In one embodiment, outlier module 216 may calculate the distance d by determining a box which includes the geographic area of the common node for the set. If the common node is the same node, the box may be small, and if the common node is an ancestor node, the box may be large. The outlier module 216 may then multiply a diagonal of the box by a predetermined percentage (e.g., 10%), and may assign the resulting value to the distance d. Once d is selected or calculated, the outlier module 216 may determine whether any POI entities of the reference set are within the distance d of the YP entity. In performing this determining, the outlier module 216 may utilize the GPS coordinates of each location entity. If no POI entities are within d of the YP entity, then outlier module 216 may deem the YP entity to be a spatial outlier.

FIG. 6 illustrates the D-P algorithm in further detail. As shown, the outlier module 216 may compare a YP entity being checked 614 to POI entities 610 comprising a reference set. If no POI entities 610 are within distance d of the YP entity 614, then the outlier module 216 may deem the YP entity 614 a spatial outlier 612. Also, the presence or absence of other YP entities 608 within the distance d of YP entity 614 may make no difference in the outcome of the POI-based algorithm.

In various embodiments, after determining that a location entity is a spatial outlier, the outlier module 216 may delete the location entity from the dataset 202, or create a new modified dataset 202 which does not include the spatial outlier. The outlier module 216 may then repeat the determination of whether an entity is a spatial outlier for some or all of the other entities of the dataset 202. In some embodiments, outlier module 216 may perform both the D-P algorithm and the POI-based algorithm for a location entity. In one embodiment, the outlier module 216 may then only delete the location entity if both algorithms deem it a spatial outlier. In another embodiment, the outlier module 216 may delete the location entity so long as it is deemed a spatial outlier by one of the algorithms.

As is further illustrated by FIG. 1, a location search server 218 may receive the modified dataset 202, with the spatial outliers deleted, from the computing device 208. Location search server 218 may be any sort of computing device or devices known in the art, such as personal computers (PCs), laptops, servers, phones, personal digital assistants (PDAs), set-top boxes, and data centers. In one embodiment, location search server 218 and computing device 208 may be the same physical computing device. Location search server 218 may be configured to provide location search services, such as Windows Local Live Search™, to a plurality of client 220 over a networking fabric, such as the networking fabric described above. The location search services may include providing the clients 220 with maps or photographs annotated with identifiers corresponding to location entities of the modified dataset 202, in some embodiments.

Exemplary Operations

Figure 3B:
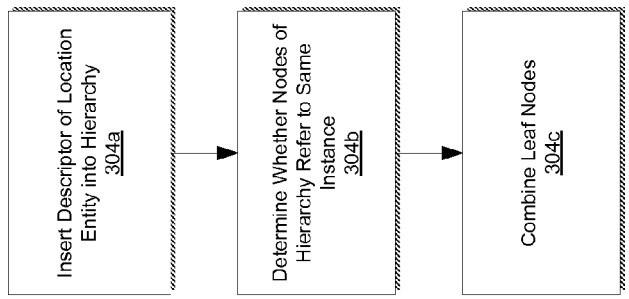
FIGS. 3A-3B are flowchart views of exemplary operations of a location dataset analysis, in accordance with various embodiments.
Figure 3A:
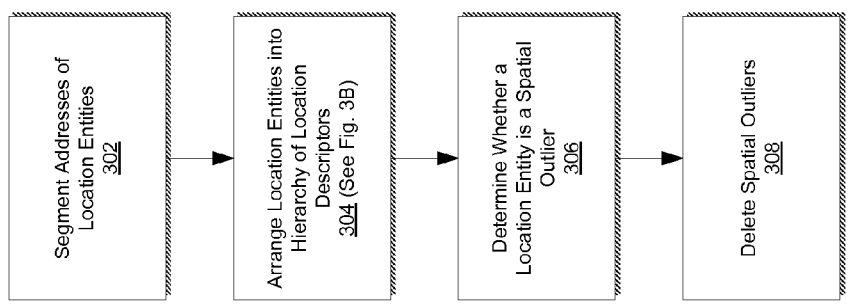

FIGS. 3A-3B are flowchart views of exemplary operations of a location dataset analysis, in accordance with various embodiments. As illustrated in FIG. 3A, a computing device may first segment address fields of a plurality of location entities into location descriptors, block 302. In some embodiments, the location entities may comprise yellow page entities and point of interest entities. Also, at least one of the location entities may comprise a location name, a location address, and a global positioning system (GPS) position. In various embodiments, the segmenting, block 302, may comprise segmenting based on commas and/or other characters indicating a separation between two or more terms. In other embodiments, the segmenting, block 302, may comprise segmenting based at least in part on one or more frameworks and/or dictionaries. In some embodiments, the framework may be a tree structure of location descriptors generated from a published description of a geographic area. Also, the dictionaries may include either a collection of breaker words used to separate location descriptors or a collection of categories derived from name fields of the location entities.

In various embodiments, the computing device may then arrange the plurality of location entities into a hierarchy of location descriptors, block 304. The arranging shown in block 304 is illustrated in greater detail in FIG. 3B and is described further herein.

As further illustrated in FIG. 3A, the computing device may then determine whether one of the location entities is a spatial outlier based at least in part on presence of one or more other location entities within a predetermined distance of the one location entity, block 306. In some embodiments, the other location entities and the one location entity may share a location descriptor. In various embodiments, the determining, block 306, may also comprise determining whether the number of other location entities within the predetermined distance of the one location entity exceeds a threshold and, in response, determining that the one location entity is a spatial outlier. Further, in some embodiments, when the one location entity is a yellow page entity and the other location entities are point of interest entities, the determining, block 306, may comprise determining whether at least one of the point of interest entities is present within a predetermined distance of the yellow page entity and, in response, determining that the yellow page entity is a spatial outlier.

In various embodiments, in response to determining that the one location entity is a spatial outlier, the computing device may delete the one location entity, block 308.

FIG. 3B illustrates the arranging of block 304 in further detail. As illustrated, the arranging may include inserting, by the computing device, a descriptor of each location entity derived from an address field of each location entity as a leaf node in a tree of location descriptors, block 304a. Next, the computing device may determine that at least two leaf nodes refer to a same instance if the nodes share the same descriptor and if the same descriptor is shared by a number of descendant nodes of a same parent, block 304b, the number exceeding a first threshold. Then, the computing device may combine the at least two leaf nodes, block 304c, the combining including retaining one of the leaf node at a lowest level in the hierarchy in which a number of occurrences of the at least two leaf nodes exceeds a second threshold.

Exemplary Computing Device

FIG. 7 illustrates an exemplary computing device 700 that may be configured to determine whether a location entity is a spatial outlier.

In a very basic configuration, computing device 700 may include at least one processing unit 702 and system memory 704. Depending on the exact configuration and type of computing device, system memory 704 may be volatile (such as RAM), non-volatile (such as ROM, flash memory, etc.) or some combination of the two. System memory 704 may include an operating system 705, one or more program modules 706, and may include program data 707. The operating system 705 may include a component-based framework 720 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 700 may be of a configuration demarcated by a dashed line 708.

Computing device 700 may also have additional features or functionality. For example, computing device 700 may also include additional data storage devices (removable and/or non-removable) such as, for example, magnetic disks, optical disks, or tape. Such additional storage is illustrated in FIG. 7 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well know in the art and need not be discussed at length here.

Computing device 700 may also contain communication connections 716 that allow the device to communicate with other computing devices 718, such as over a network. Communication connections 716 are one example of communication media. Communication media may typically be embodied by computer readable instructions, data structures, program modules, etc.

Closing Notes

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

References are made in the detailed description to the accompanying drawings that are part of the disclosure and which illustrate embodiments. Other embodiments may be utilized and structural or logical changes may be made without departing from the scope of the disclosure. Therefore, the detailed description and accompanying drawings are not to be taken in a limiting sense, and the scope of embodiments is defined by the appended claims and equivalents.

Various operations may be described, herein, as multiple discrete operations in turn, in a manner that may be helpful in understanding embodiments; however, the order of description should not be construed to imply that these operations are order-dependent. Also, embodiments may have fewer operations than described. A description of multiple discrete operations should not be construed to imply that all operations are necessary.

The description may use perspective-based descriptions such as up/down, back/front, and top/bottom. Such descriptions are merely used to facilitate the discussion and are not intended to restrict the scope of embodiments.

The terms "coupled" and "connected," along with their derivatives, may be used herein. These terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments, are synonymous.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The invention claimed is:

1. A method comprising:
    arranging, by a computing device, a plurality of location entities into a hierarchy of location descriptors, wherein individual ones of the location entities comprise global positioning system (GPS) coordinates captured by a GPS device;
    storing the plurality of location entities on a location search server, the location search server being remotely located from the computing device;
    determining, by the computing device, whether one location entity of the plurality of location entities is a spatial outlier based on determining whether a number of other location entities within a predetermined distance of the one location entity exceeds a threshold number, the other location entities and the one location entity sharing a location descriptor;
    in response to determining that the one location entity is the spatial outlier, deleting, by the computing device, the one location entity; and
    sending an update to the location search server such that the plurality of location entities on the location search server reflects the deletion of the spatial outlier.

2. The method of claim 1, wherein the plurality of location entities comprise yellow page entities and point of interest entities.

3. The method of claim 1, wherein at least one of the plurality of location entities comprises a location name, a location address, and a GPS position.

4. The method of claim 1, further comprising segmenting address fields of the plurality of location entities into location descriptors.

5. The method of claim 4, wherein the segmenting comprises segmenting based on one or more of commas and other characters indicating a separation between two or more terms.

6. The method of claim 4, wherein the segmenting comprises segmenting based at least in part on one or more of a framework and a dictionary.

7. The method of claim 4, wherein the segmenting comprises segmenting based at least in part on one or more frameworks, and wherein the one or more frameworks is includes a tree structure of the location descriptors generated from a published description of a geographic area.

8. The method of claim 4, wherein the segmenting comprises segmenting based at least in part on one or more dictionaries, and wherein the one or more dictionaries include either a collection of breaker words used to separate location descriptors or a collection of categories derived from name fields of the plurality of location entities.

9. The method of claim 1, wherein the arranging further comprises inserting a descriptor of each of the plurality of location entities derived from an address field of each of the plurality of location entities as a leaf node in a tree of the location descriptors.

10. The method of claim 9, wherein the arranging further comprises determining that at least two leaf nodes refer to a same instance if the at least two leaf nodes share a same descriptor and if the same descriptor is shared by a number of descendant nodes of a same parent, the number exceeding a first threshold number.

11. The method of claim 10, wherein the arranging further comprises combining the at least two leaf nodes, the combining including retaining one of the at least two leaf nodes at a lowest level in the hierarchy in which a number of occurrences of the at least two leaf nodes exceeds a second threshold number.

12. The method of claim 1, wherein the one location entity is determined to be the spatial outlier based on the number of other location entities within the predetermined distance of the one location entity not exceeding the threshold number.

13. The method of claim 1, wherein the one location entity is a yellow page entity and the other location entities are point of interest entities, and the determining further comprises:

determining whether at least one of the point of interest entities is present within a predetermined distance of the yellow page entity; and in response to determining that no point of interest entity is present within the predetermined distance, determining that the yellow page entity is the spatial outlier.

14. An article of manufacture comprising:

a storage device; and a plurality of executable instructions stored on the storage device which, when executed by a computing device, perform operations including:

arranging a plurality of location entities into a hierarchy of location descriptors, the plurality of location entities including yellow page entities and point of interest entities, wherein individual ones of the location entities comprise global positioning system (GPS) coordinates captured by a GPS device;

storing the plurality of location entities on a location search server, the location search server being remotely located from the computing device;

determining whether one of the yellow page entities is a spatial outlier based at least in part on presence of at least one of the point of interest entities within a predetermined distance of the one of the yellow page entities, the at least one of the point of interest entities and the one of the yellow page entities sharing a location descriptor;

in response to determining that the one of the yellow page entities is the spatial outlier, deleting the one of the yellow page entities; and sending an update to the location search server such that the plurality of location entities on the location search server reflects the deletion of the spatial outlier.

15. The article of claim 14, wherein the arranging further comprises inserting a descriptor of each of the plurality of location entities derived from an address field of each of the plurality of location entities as a leaf node in a tree of location descriptors.

16. The article of claim 14, wherein the determining further comprises, in response to determining that no point of interest entity is present within the predetermined distance, determining that the one of the yellow page entities is the spatial outlier.

17. The article of claim 14, wherein at least one of the yellow page entities comprises a location name, a location address, and a GPS position.

18. The article of claim 14, wherein the operations further comprise segmenting address fields of the location entities into location descriptors.

19. A system comprising:

a processor of a computing device; and logic configured to be executed by the processor to perform operations including:

sending a plurality of location entities to a location search server for storage on the location search server, wherein individual ones of the location entities comprise global positioning system (GPS) coordinates captured by a GPS device, and wherein the location search server is remotely located from the computing device;

segmenting address fields of a plurality of location entities into location descriptors, the segmenting including either or both of:

segmenting based on commas and/or other characters indicating a separation between two or more terms; and segmenting based at least in part on one or more frameworks and/or dictionaries;

arranging the plurality of location entities into a hierarchy of location descriptors, the arranging including:

inserting a descriptor of each of the plurality of location entities derived from an address field of each of the plurality of location entities as a leaf node in a tree of location descriptors;

determining that at least two leaf nodes refer to a same instance if the at least two leaf nodes share a same location descriptor and if the same location descriptor is shared by a number of descendant nodes of a same parent, the number exceeding a first threshold number; and combining the at least two leaf nodes, the combining including retaining one of the at least two leaf nodes at a lowest level in the hierarchy in which a number of occurrences of the at least two leaf nodes exceeds a second threshold number;

determining whether one of the plurality of location entities is a spatial outlier based at least in part on determining whether a number of one or more other location entities within a predetermined distance of the one of the plurality of location entities exceeds a third threshold number, the one or more other location entities and the one of the plurality of location entities sharing a location descriptor;

in response to determining that the one of the plurality of location entities is the spatial outlier, deleting the one of the plurality of location entities; and sending an update to the location search server such that the plurality of location entities on the location search server reflects the deletion of the spatial outlier.

20. The system of claim 19, wherein determining whether the one of the plurality of location entities is a spatial outlier further comprises:

in response to determining that the number of one or more other location entities within the predetermined distance of the one of the plurality of location entities does not exceed the third threshold number, determining that the one of the plurality of location entities is the spatial outlier.

* * * * *